(12) United States Patent
Dube

(10) Patent No.: US 9,337,610 B2
(45) Date of Patent: May 10, 2016

(54) LASER DAMAGE RESISTANT OPTICAL COMPONENTS FOR ALKALI VAPOR LASER CELLS

(71) Applicant: George Dube, Chesterfield, MO (US)

(72) Inventor: George Dube, Chesterfield, MO (US)

(73) Assignee: MetaStable Instruments, Inc., St. Peters, MO (US)

( * ) Notice: Subject to any disclaimer, the term of this patent is extended or adjusted under 35 U.S.C. 154(b) by 0 days.

(21) Appl. No.: 14/315,337

(22) Filed: Jun. 26, 2014

(65) Prior Publication Data

US 2015/0303640 A1 Oct. 22, 2015

Related U.S. Application Data

(60) Provisional application No. 61/957,232, filed on Jun. 27, 2013.

(51) Int. Cl.
*H01S 3/227* (2006.01)
*H01S 3/034* (2006.01)
*H01S 3/03* (2006.01)

(52) U.S. Cl.
CPC .............. *H01S 3/227* (2013.01); *H01S 3/0346* (2013.01); *H01S 3/031* (2013.01)

(58) Field of Classification Search
CPC ........ H01S 3/227; H01S 3/0346; H01S 3/031
USPC ........................................ 372/51, 56, 69–70
See application file for complete search history.

(56) References Cited

U.S. PATENT DOCUMENTS

| | | | |
|---|---|---|---|
| 2,943,059 A * | 6/1960 | Beck | B01J 39/085 310/682 |
| 3,432,225 A | 3/1969 | Rock | |
| 4,685,110 A | 8/1987 | DeBell et al. | |
| 7,106,762 B1 * | 9/2006 | Jiang | H01S 3/06716 372/102 |
| 2003/0089304 A1 * | 5/2003 | Kerdoncuff | C01B 9/08 117/84 |
| 2005/0127824 A1 * | 6/2005 | Mori | H01L 51/5048 313/504 |
| 2007/0279749 A1 | 12/2007 | Wu et al. | |
| 2012/0202031 A1 | 8/2012 | Soules et al. | |
| 2013/0101867 A1 | 4/2013 | Yukinobu et al. | |

OTHER PUBLICATIONS

Blattner, R. J. and A. J. Braundmeier, "Solid phase reduction of SiO2 in the presence of an Al layer," Journal of Vacuum Science and Technology, 20, 320-323 (Mar. 1982).

(Continued)

*Primary Examiner* — Dung Nguyen
(74) *Attorney, Agent, or Firm* — Douglas A. Pinnow

(57) ABSTRACT

A laser damage resistant optical component exposed to alkali vapor and intense (>1 kW/cm$^2$) light is formed by making the outermost surface of the component from a specified metal oxide or metal fluoride whose metal boils at a temperature lower than the melting temperature of that metal's oxide or fluoride, such as BaO, CdO, CaO, MgO, SrO, ZnO, CdF$_2$, MgF$_2$ or SrF$_2$. This allows the metal formed by the alkali's reduction of the metal compound to be vaporized and removed by the laser beam at a temperature that does not melt or deform the host compound or substrate. The alkali reduction of metal compounds, other than those listed above, leaves metals that are heated by the laser beam to a temperature above the melting point of the host compound and/or common substrates such as silica or alumina which can lead to their damage.

10 Claims, 5 Drawing Sheets

(56) References Cited

OTHER PUBLICATIONS

Bouchiat, M. A., et al "Electrical conductivity of glass and sapphire cells exposed to dry cesium vapor," Applied Physics B, 68, 1109-1116 (Jun. 1999).
Krupke, W. F., Diode pumped alkali laser, U.S. Pat. No. 6,643,311 B2 (filed Oct. 23, 2001—issued Nov. 4, 2003).
Krupke, W. F. et al "New class of cw high-power diode-pumped alkali lasers (DPALs)," Proc. SPIE 5448, 156 (2004).
Quarrie, L. O., "The effects of atomic rubidium vapor on the performance of optical windows in Diode Pumped Alkali Lasers (DPALs)," Optical Materials 35, 843-851, (2013).
Slabinski, V. J. et al, "Lithium Vapor Cell and Discharge Lamp Using MgO Windows." Review of Scientific Instruments 42.9, 1334-1338 (2003).
Zweiback, J. et al "28W average power hydrocarbon-free rubidium diode pumped alkali laser," Optics Express 18, 1444-1449 (2010).

\* cited by examiner

LASER DAMAGE RESISTANT OPTICAL COMPONENTS FOR ALKALI VAPOR LASER CELLS

CROSS REFERENCES TO RELATED APPLICATIONS

This application claims the benefit of U.S. Provisional Patent Application Ser. No. 61/957,232 filed Jun. 27, 2013, titled LASER DAMAGE RESISTANT OPTICAL COMPONENTS FOR ALKALI VAPOR CELLS, the contents of which are hereby incorporated by reference herein.

TECHNICAL FIELD AND INDUSTRIAL APPLICABILITY OF THE INVENTION

The present invention relates to optical components that have a high resistance to laser damage when exposed to alkali metal vapors and intense (>1 kW/cm$^2$) laser light as in an alkali vapor laser cell.

BACKGROUND OF INVENTION

Lasers utilizing an alkali vapor as the lasing medium have great potential as very high power lasers for military, industrial and scientific applications [Krupke et al, "New class of cw high-power diode pumped alkali lasers (DPALs)", Proc. SPIE 5448, p. 156 (2004)].

Their high efficiency (related to a small quantum defect) and ability to remove heat and reduce pump induced distortions by flowing the vapor through the pumped/lasing region hold promise for highly efficient very powerful lasers. They can be pumped by efficient laser diode arrays.

The alkali vapor is contained in a cell, a portion of which is within the laser cavity. The laser cavity is defined by the lasing medium, an output coupler (OC), also referred to as a partial reflector, and a mirror high reflector (HR). The HR and/or OC may be incorporated in the walls of the cell with the alkali vapors or the cell may contain one or two windows through which the laser beam travels.

Typically the pump energy for these lasers is supplied by multiple laser diodes. This pump light may by itself be intense enough to damage optical components in the laser.

In the course of scaling these lasers to higher powers it became evident that the highly reactive alkali vapors were chemically attacking the outer layer of the thin film dielectric coatings used for antireflection (AR) coated windows, partially reflecting output couplers (OC) or highly reflecting mirrors (HR) when these components were incorporated into the walls of the cell. The chemical attack leaves deposits on the surface. The deposits are heated by the laser and/or pump beam(s), causing the surface to damage and extinguish the laser output [Zweiback et al, "28 W average power hydrocarbon-free rubidium diode pumped alkali laser" Optics Express 18, pp 1444-1449 (2010)]. Prior art efforts have been directed at choosing or developing bulk or coating materials that resist alkali attack or are only slowly attacked. However, none of the materials have proven to be fully satisfactory for long term operation when in direct contact with alkali vapors.

High power lasers (HPLs) often achieve powers so high that their optical components are heated by their residual (<0.1% or 1000 ppm) absorption of the laser beam. Since the heating is not uniform across a diameter, the laser beam's wave front is distorted from the non-uniform change in the shape of the component. For example, a one cm thick window with an absorption coefficient of only 0.0005 cm$^{-1}$, transmitting a 100 kW/cm$^2$ beam, is heated with 50 W/cm$^2$ due to residual absorption. This grossly distorts the beam transmitted through the window and may fracture some windows. In extreme cases the component may be catastrophically fractured or melted, terminating the laser output. It is crucial that the absorption of optical components for HPLs have minimal (typically, less than 10 ppm) absorption.

Sapphire ($Al_2O_3$) and silica ($SiO_2$) are used as common alkali vapor laser window materials and optical component substrates. Both are highly transparent and commercially available. Sapphire has greater strength and scratch resistance, while silica has a lower thermal expansion coefficient to reduce thermal stress.

In a diode pumped alkali vapor laser (DPAL) there is additional heating of the vapor cell windows or other optical elements in contact with the alkali vapor because the vapor is heated, typically to greater than 200° C., which heats any window in contact with it. In addition, chemical reactions between the alkali and the window/coating may add heat and/or leave a deposit that is heated by the laser and/or pump beam(s). Window contamination/laser damage issues have arisen during the development and scaling up of these lasers to high powers [see Zweibeck et al, Optics Express 18, pp. 14445-1449 (2010)].

The literature refers to a variety of alkali vapor cell window contamination issues, including impurities common to gas cells and gas circulation systems, decomposition products (largely eliminated by using He as the buffer gas instead of a hydrocarbon), adsorbed alkali metals, alkali metal oxides and alkali metal hydroxides/hydrates. Not only must permanent physical damage to the laser components be avoided, it is also necessary to avoid contamination that degrades the performance of the laser by refracting (thermal lensing), scattering, reflecting or absorbing light that should instead be contributing to the output of the laser. Windows examined after lasing may be contaminated by substances that were not present during lasing. For example, alkali metal atoms may react with a metal oxide surface to form an alkali oxide, but upon opening the chamber to the atmosphere, that alkali oxide may be converted to an alkali hydroxide/hydrate.

Laser damage of the optical components exposed to both an alkali vapor and the alkali laser pump beam or laser beam is limiting the power scaling and advancement of alkali vapor lasers. Clearly, a coating material that was less prone to chemical attack and/or catastrophic optical damage would represent a substantial improvement in the developing field of alkali vapor lasers.

See also U.S. Pat. No. 4,685,110 and U.S. Pub No.: 2012/02002031.

SUMMARY OF THE INVENTION

The following description illustrates the general principles of the present inventions and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

Throughout this patent application, alkali vapor refers to any gas which contains one or more alkali materials; lithium (Li), sodium (Na), potassium (K), rubidium (Rb) or cesium (Cs). Typically this vapor also contains at least one other gas buffer material such as helium (He). The more common alkali vapor lasers and their primary output wavelength [rounded off to the nearest wavelength specified in nanometers (nm)] include K at 776 nm, Rb at 795 nm and Cs at 895 nm. The respective pump wavelengths are 770, 780 and 852 nm. The closeness of the pumping and lasing wavelength indicates the low quantum defect and associated low heat deposition that makes highly efficient lasing possible.

This invention teaches that catastrophic laser damage of optical components can be avoided by choosing materials that when chemically attacked by an alkali vapor leave an easily vaporizable deposit on the surface (deposits with a low vaporization or boiling temperature). Unlike traditional prior art materials which leave refractory deposits, these deposits are evaporated by the laser or pump beams before they become hot enough to melt and damage the other coating layers and/or substrate.

Laser damage of the optical components exposed to both an alkali vapor and the alkali laser pump beam or laser beam is limiting the power scaling and advancement of alkali vapor lasers. Chemical reactions between the alkali and the component create deposits. These deposits are heated by absorbing power from the laser beam, causing permanent disfigurement and damage to the surface, which diminishes or extinguishes the laser output. It is therefore the goal of this invention to teach optical components that are not catastrophically damaged by these exposures.

It is an object of this invention to produce optical components, including, windows, lenses, output couplers and mirrors which have a high laser damage threshold when exposed to both reactive alkali vapors and one or more intense laser beams, as in an alkali vapor laser cell.

In one embodiment an existing component or coating of any typical type (AR, OC or HR) is over coated by a single (absentee) layer of barium oxide, cadmium oxide, calcium oxide, magnesium oxide, strontium oxide or zinc oxide. Absentee layers have an optical thickness of one half wavelength and do not alter the reflection of light at that wavelength.

In another embodiment an existing component or coating of any typical type (AR, OC or HR) is over coated by a single (absentee) layer of cadmium fluoride, magnesium fluoride or strontium fluoride.

In another embodiment the final layer or layers of a multilayer coating of any type (AR, OC or HR) are made from barium oxide, cadmium oxide, calcium oxide, magnesium oxide, strontium oxide, zinc oxide cadmium fluoride, magnesium fluoride or strontium fluoride. The thickness of these layers is as required to perform their optical function (reflection, position of peak electric field, etc.). The substrate or multiple layer coating may contain only the above listed materials.

BRIEF DESCRIPTION OF THE DRAWINGS

The above SUMMARY OF THE INVENTION as well as other features and advantages of the present invention will be more fully appreciated by reference to the following detailed descriptions of illustrative embodiments in accordance with the present invention when taken in conjunction with the accompanying drawings, wherein.

DETAILED DESCRIPTION OF THE DRAWINGS

Figure 1:
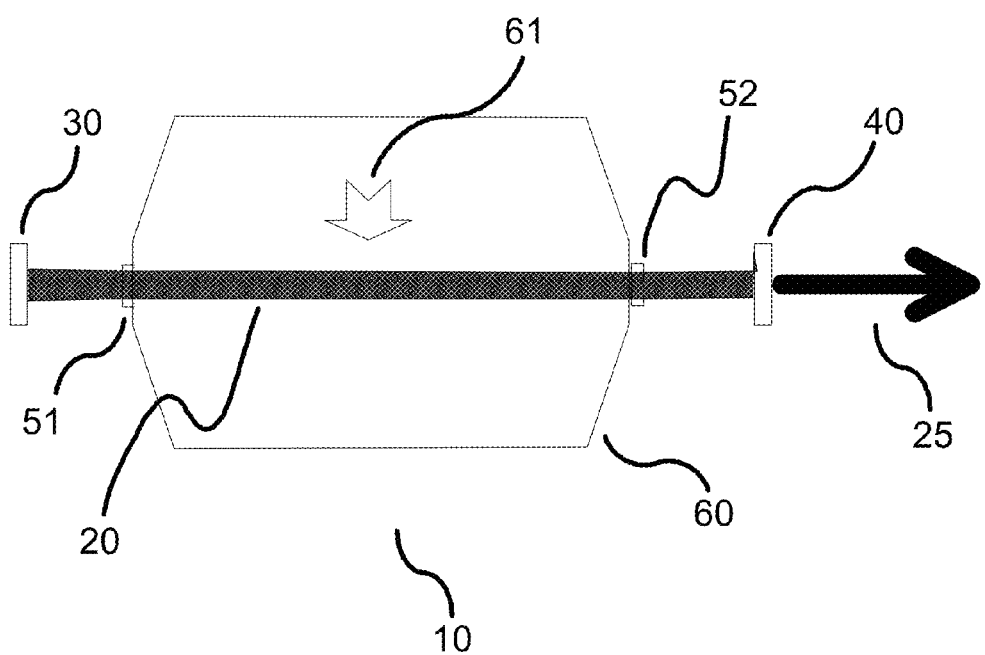
FIG. 1 shows one version of an alkali vapor laser with the high reflector (HR) and output coupler (OC) located remote from the flowing alkali vapor. The flowing vapor is in direct contact with two windows oriented perpendicular to the optical beam.

FIG. 1 depicts one version of an alkali vapor laser (10). It also serves to aid in establishing the nomenclature and positioning of the components that are the subject of this invention. The laser cavity is defined by the high reflector/mirror (HR) (30) and the output coupler (OC) (40). The intracavity beam (20) is contained by the OC (40) and HR (30). Typically the HR reflects >99% of the laser light and the OC reflects less than 50%. The output beam of the laser (25) exits the laser cavity through the OC (40). In the case shown two windows (51 and 52) allow the laser beam to enter and exit the alkali vapor cell (60). Alkali vapor (61) flows across the laser cavity to quickly replenish alkali atoms involved in the lasing process. Typically these windows will have antireflection (AR) coatings on both sides to minimize the reflective losses of the laser beam. Alkali vapor lasers are optically pumped, often by laser diodes. Alkali lasers may be side pumped or end pumped. No optical pumping components are shown in this or any other figure. Similarly the equipment that contains and circulates the alkali vapor is not shown.

Figure 2:
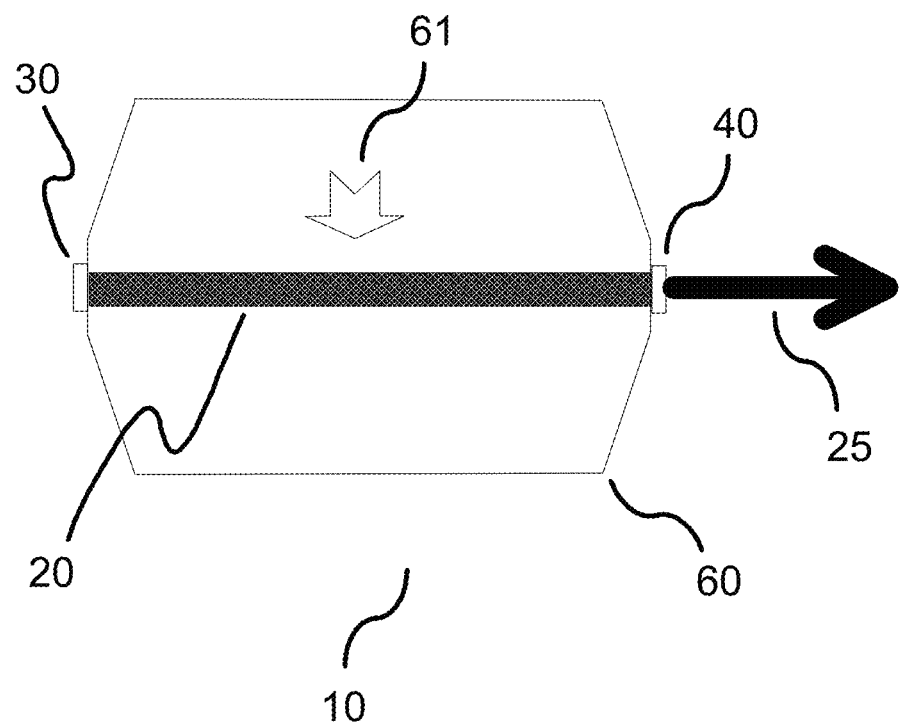
FIG. 2 shows an alternate version of an alkali vapor laser with the high reflector (HR) and output coupler (OC) are directly exposed to the flowing alkali vapor.

FIG. 2 depicts an alkali vapor laser (10) in which the HR (30) and OC (40) are mounted on the walls of vapor cell (60). This eliminates the requirement for two windows, but places the more expensive HR (30) and OC (40) in contact with the alkali vapor, which may reduce their lifetime relative to damage and need for replacement. HR and OC optical components tend to be more expensive than windows as they typically require more coating layers than an uncoated Brewster angle window or an antireflection (AR) coated window.

Our understanding is that alkali laser vapor cell optical component damage is a two step process.

Step 1. Any metal oxide (MO) coating or substrate exposed to alkali (A) metal vapor will be chemically reduced, leaving deposits of that metal (M) and alkali oxides (AOs) on the surface,

For an antireflection (AR) coated sapphire ($Al_2O_3$) window in a rubidium (Rb) laser, the outermost MO layer exposed to the Rb is often selected to be silica ($SiO_2$), so in this case the above reaction would become,

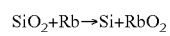

[Si is technically a metalloid, not a metal, but it absorbs near infrared light (optical wavelengths less than 1 micron) and will be considered a metal throughout this application.] There are four rubidium oxides ($Rb_2O$, $Rb_2O_2$, $Rb_2O_3$ and $RbO_2$), so the details of this reaction will vary, but all leave Si, adsorbed Rb and Rb oxides on the surface. If hydrogen is available, rubidium oxides are likely to convert to RbOH, rubidium hydroxide.

Aluminum (Al), which is much less reactive than any of the alkali metals, is known to reduce $SiO_2$ [Blattner et al, "Solid phase reduction $SiO_2$ in the presence of an Al layer", Journal of Vacuum Science and Technology, 20, pp. 320-323 (March 1982)], so there is little doubt that alkali metals reduce $SiO_2$. The walls of (non-laser) alkali vapor cells have been reported to become electrically conductive. This has been attributed by some to adsorbed alkali metal, but might also be Si or Al from reduced $SiO_2$ (glass) or $Al_2O_3$ (polycrystalline alumina) [Bouchiat et al, "Electrical conductivity of glass and sapphire cells exposed to dry cesium vapor". Applied Physics B, 68, pp. 1109-1116 (June 1999)]. Both the surface metal (M=Si in the above example) and adsorbed alkali (A) will be on the surface and they may alloy when heated by an intense laser or pump beam.

The first few monolayers of Si created by exposure to an alkali shield the $SiO_2$ from the alkali, so the reduction reaction is impeded. This is consistent with observations that there was no visible change in substrates of $SiO_2$, $Al_2O_3$, $MgF_2$ or $CaF_2$ exposed for one week to Rb vapor at 200° C. [Quarrie, "The effects of atomic rubidium vapor on the performance of optical windows and Diode Pumped Alkali Lasers (DPALs)", Optical Materials 35, pp. 843-851 (2013)]. Metal films less than 1 nm thick might not be visible, but will absorb and be heated by incident laser light or pump light. Quarrie's tests did not include exposure to intense light, so those samples never experienced the higher temperatures known to increase reaction rates, cause phase changes and soften materials.

Step 2. The intense alkali laser beam (and/or pump beam for end-pumped alkali lasers) will heat any deposit that absorbs at those wavelengths. All metals absorb near infrared light. If the laser heated metal deposit vaporizes (boils) at a temperature higher than the melting temperature of the metal oxide from which it came, the metal will stay in place and heat the oxide until the oxide melts/deforms/damages. Window temperature >500° C. has been reported for a Rb laser sapphire window [private communication, Captain Nelson Tang]. This temperature reading was obtained from infrared (IR) observations from outside of the window, so the inner (exposed to Rb) surface of the window was probably hotter. After the Si, Rb and Rb compound deposits are vaporized, the $SiO_2$ is again exposed to the Rb vapor and the reduction reaction begins anew. Rough calculations indicate that an irradiance >10 kW/cm$^2$ very quickly (<1 ms) removes a monolayer of metal, so the presence of the laser and pump beams speeds up the reduction reaction and heats the surface to the vaporization/boiling temperature of the metal.

Typical coating and substrate metal oxides including silica ($SiO_2$), sapphire/alumina ($Al_2O_3$), tantala ($Ta_2O_5$), niobia ($Nb_2O_5$), titania ($TiO_2$), hafnia ($HfO_2$) and zirconia ($ZrO_2$) have a melting temperature lower than the vaporization temperature of their metal. Thin layers or islands of these metals will be laser heated to temperatures that melt and damage the host coating or substrate.

$Al_2O_3$ was long ago suggested for coatings to reduce photoreduction of laser windows in less intense laser beams and less reactive environments [U.S. Pat. No. 4,685,110]. $Al_2O_3$, $HfO_2$ and $ZrO_2$ have more recently been specifically recommended for alkali vapor laser optical components or coatings because based on electro negativity they are more resistant to attack by alkali vapors [U.S. Patent Application 2012/02022031]. However, these materials are not immune to attack.

Metal fluorides will also be reduced by alkali vapors, so a similar theory applies for metal fluoride coating materials and substrates.

All alkalis boil/vaporize at less than 1330° C., so adsorbed alkali atoms in/on the surface should be removed at temperatures well below the melting temperature of the coating or substrate. Adsorbed alkali atoms will therefore not cause laser damage when irradiated by the laser beam. Alkalis form multiple oxides and may alloy with other metals. It is believed from what information is available that most alkalis and alkali compounds vaporize or decompose at a temperature <1400° C. If this is true, the adsorbed alkali metals, alkali oxides or other alkali compounds are not responsible for the laser induced damage; rather the damage results from metallic Si, Al, Ta, Nb, Ti, Hf or Zr created by reactions with the alkali metal and heated by the laser and/or pump beam. Any alkali or alkali compounds on the laser heated surface are gone (vaporized) before the surface melts/damages.

The following is an inventive solution to the problem that optical components in alkali laser cells are damaged by the laser beam. There are at least six metal oxides (and three metal fluorides) for which the boiling/vaporization temperature of the metal is lower than the melting temperature of its oxide (or fluoride). Table 1 lists the melting and boiling temperatures of many materials used or potentially to be used in optical components for alkali vapor laser cell components.

The six metal oxides mentioned above are barium oxide (BaO), cadmium oxide (CdO), calcium oxide (CaO), magnesium oxide (MgO), strontium oxide (SrO) and zinc oxide (ZnO). The three fluorides are cadmium fluoride ($CdF_2$), magnesium fluoride ($MgF_2$) and strontium fluoride ($SrF_2$). Coatings or substrates of these materials will still be attacked/reduced by an alkali, but should not suffer catastrophic laser damage. Of special additional importance, the boiling/vaporization temperature of each of these metals is lower than the melting temperature of common substrates such as sapphire (2050° C.) and silica (~1610° C.).

TABLE 1

Some thermal and optical properties of materials that may be exposed to alkali vapor and laser beams.

| Material | Melting Temperature ° C. | Boiling Temperature ° C. | n @ 795 nm | Comments |
|---|---|---|---|---|
| Al | 660 | 2519 | 1.971 | |
| $Al_2O_3$ | 2072 | 2977 | 1.7523 | |
| Ba | 727 | 1897 | | Reacts with $H_2O$ |
| BaO | 1972 | 2000 | 1.960 | |
| Bi | 271 | 1560 | | |
| $Bi_2O_3$ | 820 | 1890 | | |
| Ca | 842 | 1240 | | Reacts with $H_2O$ |
| CaO | 2572 | 2850 | ~1.81 | Reacts with $H_2O$ |
| $CaF_2$ | | | 1.4306 | |
| Cd | 320.9 | 767 | | |
| CdO | >900 | 1559 | ~1.48 | Sublimes |
| $CdF_2$ | 1110 | 1748 | 1.576 | |
| Co | 1495 | 2900 | | |
| CoO | 1800d | | | d = decomposes |
| Cr | 1890 | 2480 | | cell components |
| Cs | 28.5 | 671 | | |
| Cu | 1083 | 2336 | | cell components |
| Fe | 1535 | 3000 | | cell components |
| Hf | 1700 | 3200 | | |
| $HfO_2$ | 2810 | | 1.97 | |
| K | 63.5 | 759 | | |
| La | 918 | 3464 | | |
| $La_2O_3$ | 2304 | 3620 | | |
| Li | 180.5 | 1330 | | |
| Mg | 650 | 1090 | 0.47975 | |
| MgO | 2825 | 3600 | 1.7278 | |
| $MgF_2$ | 1263 | 2227 | 1.37 | |
| Na | 97.8 | 883 | | |
| Nb | 2500 | 3700 | | |
| $Nb_2O_5$ | 1520 | | 2.2 | |
| Rb | 38.5 | 700 | | |
| $Rb_2O$ | 627 | | | |
| $Rb_2O_2$ | 570 | | | |

TABLE 1-continued

Some thermal and optical properties of materials that may be exposed to alkali vapor and laser beams.

| Material | Melting Temperature ° C. | Boiling Temperature ° C. | n @ 795 nm | Comments |
|---|---|---|---|---|
| $Rb_2O_3$ | <500 | | | |
| $RbO_2$ | 412 | | | |
| RbOH | 382 | 1390 | | |
| RbH | ~172d | | | d = decomposes |
| Si | 1420 | 2355 | 3.697 | |
| $SiO_2$ | ~1610 | 2230 | 1.4535 | |
| Sr | 777 | 1382 | | Reacts with $H_2O$ |
| SrO | 2531 | | ~1.80 | Reacts with $H_2O$ |
| $SrF_2$ | 1477 | 2460 | 1.439 | |
| Ta | 2996 | 5458 | | |
| $Ta_2O_5$ | 1470d | | 2.1864 | d = decomposes |
| Ti | 1800 | 3000 | | |
| $TiO_2$ | 1640d | | 2.25 | d = decomposes |
| Zn | 419.5 | 907 | | |
| ZnO | 1974 | 1800 | ~1.96 | Sublimes |
| Zr | 1857 | 2900 | | |
| $ZrO_2$ | 2715 | | 2.178 | |

"n" is the refractive index.

BaO, CaO and SrO react with water, which may limit their practicality as exposed surfaces may become "cloudy" over time. This leaves CdO, MgO and ZnO as the more practical candidate materials. Of these three, preliminary investigation suggests that the very low absorption (VLA) necessary for successfully transmitting very high irradiance laser beams may be more practically achieved with MgO. Single crystal MgO windows have been used in (non-lasing) alkali vapor cells [Slabinski et al, "Lithium Vapor Cell and Discharge Lamp Using MgO Windows", Review of Scientific Instruments 42.9 pp. 1334-1338 (2003)]. The three metal fluorides may also be of interest, but tend to be softer and less durable than oxide coatings. $MgF_2$ is a very common AR coating material and low index coating material.

Some of the prior art states that polycrystalline alumina ($Al_2O_3$) (PCA) is not reduced by alkalis and is used in high pressure sodium lamps for that reason. The prior art [U.S. Pat. No. 4,685,110 (referred to subsequently as "DeBell") and U.S. Patent Application 2012/0202031 (referred to subsequently as "Soules")] suggests that alumina is therefore a good choice for substrates and coatings exposed to reactive vapors. This invention teaches that alumina is reduced by alkalis more slowly than many other materials. In an alumina walled lamp or laser vapor cell the alkali attack deposits a thin (less than 10 nm) layer of aluminum (M=Al) and alkali oxide(s) on the surface. The thin Al layer shields the alumina from further attack. The lamp eventually fails because aluminum, adsorbed alkali and alkali oxides build up to a thickness than reduces the transmission of the light emitted by the sodium/alkali.

In a laser there is a complication that is not present in a lamp. The intense (>1 kW/cm$^2$) laser and/or pump beam(s) heat the deposits. If the beams are intense enough the deposits are vaporized. Further, if the vaporization/boiling temperature of the deposits is higher than the melting temperature of the coating or substrate, the coating or substrate is damaged and the laser output diminished or extinguished. This is the case for each of the "refractory" coating materials suggested by the prior art [Soules, DeBell] and those most widely used in optical coatings, including silica ($SiO_2$), sapphire/alumina ($Al_2O_3$), tantala ($Ta_2O_5$), niobia ($Nb_2O_5$), titania ($TiO_2$), hafnia ($HfO_2$) and zirconia ($ZrO_2$).

This invention teaches that the laser damage of the substrate or coating can be avoided by using metal oxide coating or substrate materials whose metal vaporizes/boils at a temperature lower than the melting temperature of their oxide. Metal oxides with this property include barium oxide (BaO), cadmium oxide (CdO), calcium oxide (CaO), magnesium oxide (MgO), strontium oxide (SrO) and zinc oxide (ZnO). Fluorides with the same characteristic include cadmium fluoride ($CdF_2$), magnesium fluoride ($MgF_2$) and strontium fluoride ($SrF_2$).

It was not previously realized that these less traditional materials will be more resistant to catastrophic laser damage than the traditional "refractory" materials now being used because these less traditional metals (created by reaction of the metal oxide with the alkali vapor) when heated by the laser or pump beam will vaporize and leave the surface at a temperature below the melting temperature of the host coating or substrate; they will not be the source of heat to melt or damage the coating or the substrate.

Figure 3:
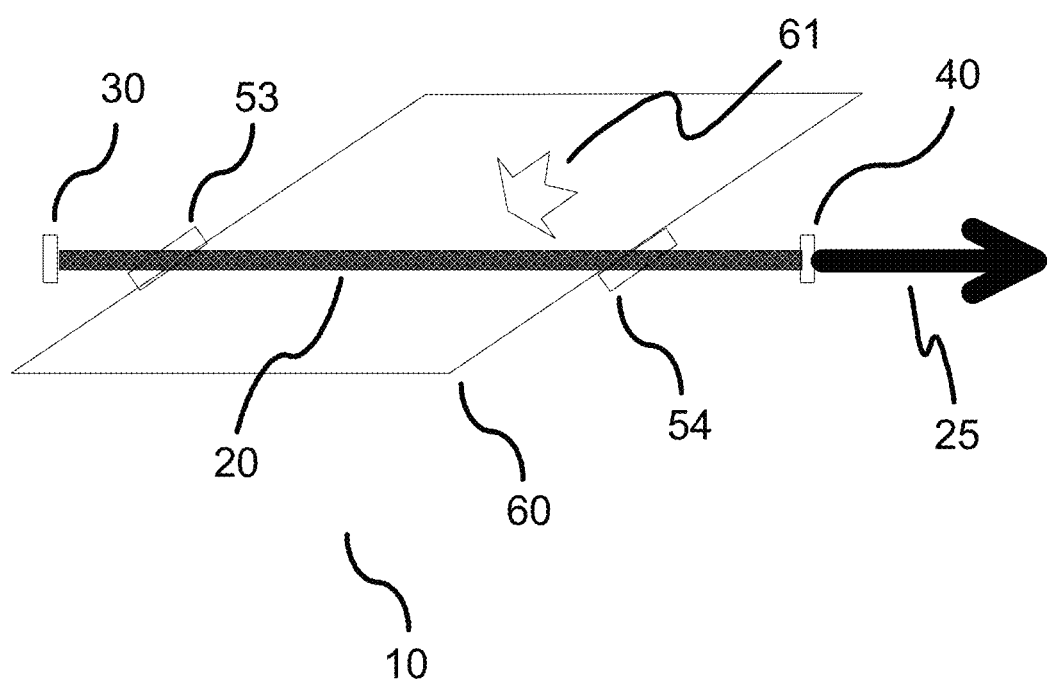
FIG. 3 shows another alternate version of an alkali vapor laser similar to FIG. 1 but with the flowing vapors in direct contact with two windows oriented at Brewster's angle to the laser beam.

FIG. 3 depicts an alkali vapor laser (10) in which the two windows (53 and 54) are Brewster angle windows. These windows do not require any AR coating for "p" polarized light and present a slightly larger area (by virtue of the geometry associated with the Brewster angle) to be irradiated by the laser beam, which may raise the laser output achievable before damage results.

Figure 4:
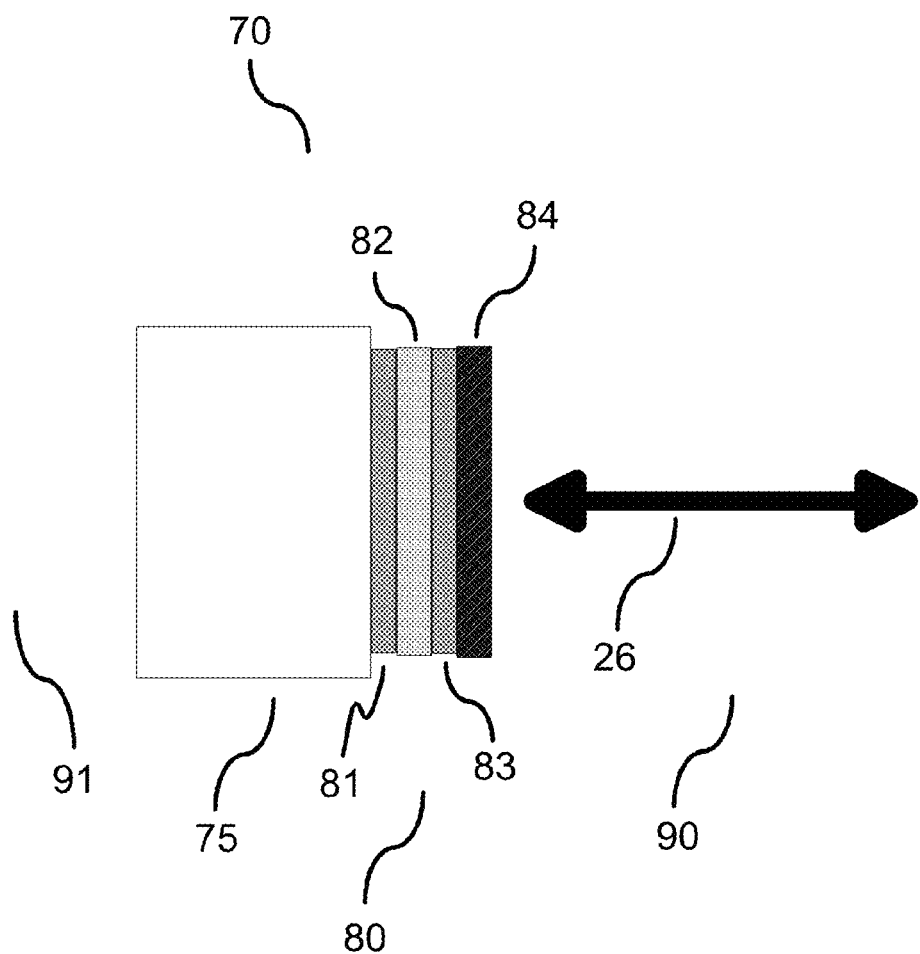
FIG. 4 depicts an optical component consisting of a substrate on the left with a multiple layer coating on the right hand surface.

FIG. 4 depicts an optical component (70) showing the substrate (75) and a multiple layer coating (80) on one surface. The coating layer (81) that contacts the substrate (75) is designated the first coating layer and subsequent layers (82), (83) and (84) are numbered sequentially from there on. The final layer (84) is the outermost layer which contacts whatever atmosphere (90) the component is placed in. Of interest for this invention is an atmosphere (90) of highly reactive alkali vapor. There may also be other buffer gases present in the atmosphere within the alkali vapor cell. The other side of the component typically is in an air atmosphere (91).

At this point in the discussion, it will be helpful to introduce and discuss the concept of absentee layer coatings An overcoat of optical thickness nd (where n is the index of refraction and d is the physical thickness) having a multiple m of one-half wavelength (nd=m$\lambda$/2, where m is a positive integer) does not alter the reflectivity of the optical component at that wavelength. Such layers are often called "absentee layers" for this reason. Any existing optical component, whether coated or not, can be over coated with an absentee layer of these materials. This overcoat should protect the host component from damage by the laser beam and alkali vapor. This technique could be applied to antireflection (AR) coatings, output coupler coatings (OC or partial reflectors—PR), high reflectivity (HR) coatings or uncoated windows or OCs. If the absentee overcoat is porous, some alkali may reach the layer beneath the overcoat and lead to laser damage. Thus low porosity over coatings are favored, or the last several layers of the coating should be made of the materials suggested (and not of traditional refractory coating materials).

It is not known how long it will take the combined action of the alkali vapor and the laser heating to remove a layer of the suggested materials, nor what thickness of the suggested materials is required to prevent the alkali vapor from reaching and reacting with materials that are not suggested, such as hafnia, zirconia, titania, niobia, alumina, silica. For coating layers this in part depends on the porosity of the coating of the suggested material, but the optical effect of any coating must be taken into account. Typically HR coatings contain alternating layers of one-quarter wavelength optical thickness layers of a high (H) refractive index material and a low (L)

refractive index material. The high index layers are therefore approximately 100 nm thick and the low index layers are approximately 130 nm thick, depending on the wavelength and refractive index.

Under certain conditions the over coating of an optical component will not affect that component's reflectivity of light at a certain wavelength. The technique of absentee coatings has already been described. Extremely thin layers less than 10 nm will have only a small effect on the reflectivity of the component, but achieving low porosity in such thin layers is a challenge. If the coating material has the same refractive index as an uncoated substrate, a coating of any thickness will cause little change in the reflectivity. As one example MgO coatings of any thickness could protect Brewster angle alumina (sapphire) windows from laser damage (in an alkali vapor cell) as both materials have an index ~1.74. Sapphire is slightly birefringent so it is usually oriented to minimize the depolarization of the light. Similarly a strontium fluoride coating might protect silica as both materials have an index ~1.44.

Coatings and components of these materials will still be attacked/reduced by the alkali vapor and the reflectivity of these coatings will change as this attack thins the outermost layer, but this should not lead to catastrophic damage. The change in reflectivity could be monitored to indicate when the optical component should be replaced.

Figure 5:
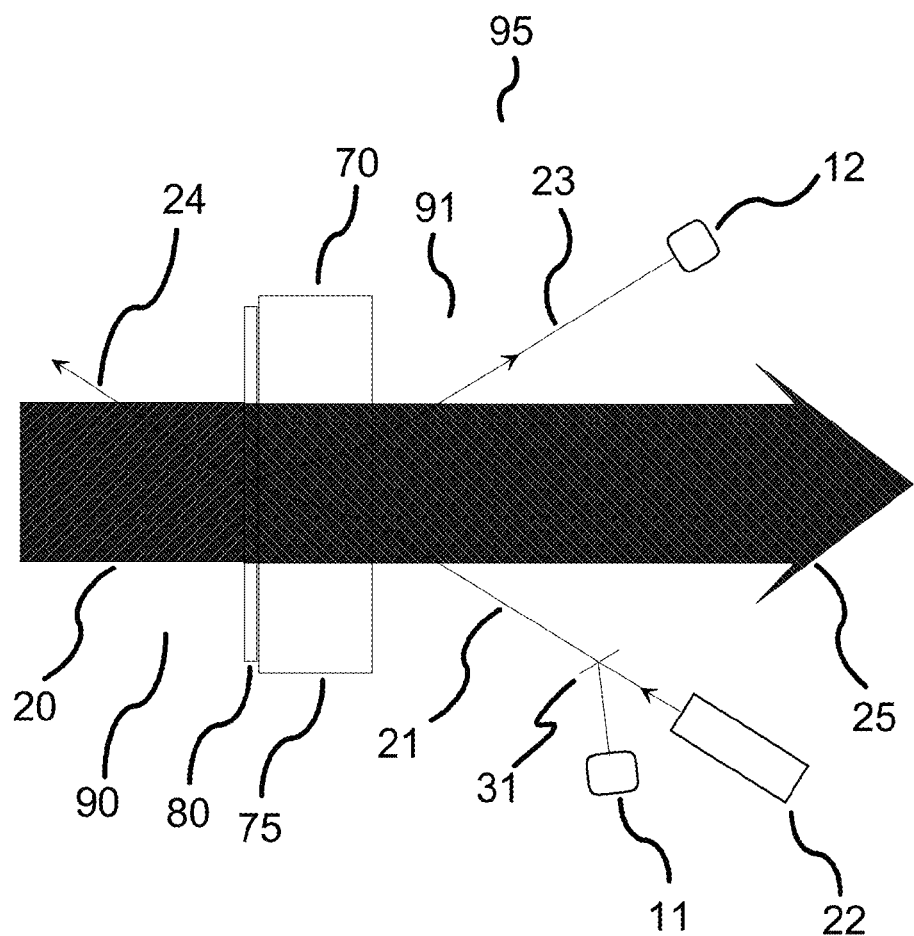
FIG. 5 shows a setup for monitoring the lifetime performance of an output coupler (OC).

FIG. 5 depicts a monitoring setup for an output coupler (OC) component (70). The laser output (25) proceeds to the right from the OC (70). To the left of the OC is the intracavity laser beam (20), travelling both to and from the OC from the HR (not shown). Similar arrangements can be used for other optical components. Light (21) from a light source (22) illuminates the coating to be monitored (80). Linearly polarized light is often preferred. A beam splitter (31) directs a fraction of this light to a reference detector (11). The light reflected from the coating (23) enters signal detector (12). Some light is also transmitted by the coating (24). The ratio of the signal detector (12) output to the reference detector (11) output is proportional to the reflectivity of the coating. This ratio may be obtained electronically or manually. Various techniques, well known to those skilled in the art, may be used to improve the sensitivity of the reflectivity measurement, such as modulating the light and using a synchronous locked-in amplifier to detect the signal. Generally the light used to monitor the coating will be of a wavelength different than the wavelength of the alkali laser. For OCs and HRs the laser beam (25) is usually at normal incidence to the surface, as shown.

FIG. 5 shows one concept for monitoring the change in reflectivity of an optical component (70) of an alkali laser vapor cell. The probe wavelength can be different than the laser wavelength, but need not be. Thin film design codes can determine the relationship between outer coating layer (84) thickness and reflectivity for any wavelength if the coating design is known. Other factors may alter the reflectivity, including deposits of metals or metal alloys, scattering from defects and changes in the refractive index of the materials at high temperatures and stresses that result from lasing.

The change in reflectivity as the outermost (exposed to the alkali) layer is thinned is most troublesome for AR coatings and is little or no problem for HR coatings. An HR coating typically contains a few dozen layers of alternating high (H) and low (L) index materials. The change in reflectivity caused by any change in thickness of the outermost layer of an HR coating is typically ~0.1%. Removing the outermost layer might change the reflectivity from 99.9% to 99.8%. Removing the outermost layer of an AR coating typically alters the reflectivity from ~0% to approximately 20%, clearly unacceptable. The proposed solution eliminates catastrophic damage of AR coatings, but limits their useful lifetime to the time it takes the alkali vapor and laser/pump light to significantly thin the outermost layer.

Because the proposed solution eliminates catastrophic damage, there will no longer be a need to expose any AR coatings to alkali vapor. FIGS. 1 and 3 show the laser cavity of a typical DPAL that uses windows on the vapor cell. The alkali vapor is contained in a cell that requires two windows, each window AR coated on both sides (or uncoated and positioned at Brewster's angle). The mirror/HR and OC (output coupler) are located outside of the cell where they are not exposed to the highly reactive alkali vapor. Because catastrophic damage can be avoided by the proposed new coatings, the OC and HR could replace the windows, as shown in FIG. 2.

Typically the reflectivity of the OC is less than or equal to 50%. A single Fresnel reflection from MgO, ZnO or BaO substrate surface is ~7%, 10.5% or 10.5%, respectively. To avoid constructive/destructive interference the other surface of the MgO (not exposed to the alkali vapor) should be AR coated or wedged. A resonant reflector of a single MgO plate has a peak reflectance of ~25%. Its effective reflectance would vary as the window gets heated by the transmitted laser beam and as it gets thinned by the Rb vapor (both change the optical path between the two reflecting surfaces). As mentioned elsewhere MgO coatings of any thickness on the surfaces of a sapphire resonant reflector should protect the sapphire and not alter its (single surface) reflectivity.

Another possibility may be to use Brewster angle windows of MgO or a similar material. The polished surface of the window exposed to the alkali vapor will still be attacked, but no catastrophic damage should result. In practice the eating away of any surface by the alkali vapor (and light beams) will probably not be uniform and the surface may eventually become so rough that light will be scattered and refracted out of the laser/pump beam. It is beyond the scope of this application to redesign DPALs, but eliminating catastrophic window/coating damage may allow significant design improvements.

Complete coatings using many layers of these less traditional materials may also be made, but it is only the outermost layer of any coating that gets directly exposed to the alkali vapor. Coatings for only one wavelength typically use one high refractive index material (H) and one low refractive index material (L). High reflectance is generated by multiple alternating H and L layers, each H and L being one-quarter wave in optical thickness. Several dozen layers are often necessary to achieve R>99.9%. Of the six materials mentioned above, only CdO seems suited as a low (n<1.5) index material. MgO has the next lowest n at ~1.73. Among the fluorides, $MgF_2$ has the lowest index at ~1.37.

The introduction of small amounts of Mg or similar atoms into the alkali vapor is not expected to be a problem, because no problems have been attributed to the small amounts of Si that we suspect have already been experienced. However, because of the relative ease of vaporizing Mg and similar materials and the expected longer duration of lasing before damage, a higher concentration of these materials in the vapor may be expected.

Coatings for use with high power alkali laser beams should have other special properties, including very low absorption (preferably ☐2 ppm), low porosity and thermal expansion properties compatible with the substrate and the other materials within the same coating.

In summary, the proposed invention;
1. Eliminates catastrophic damage, but requires replacement of the coatings or components after a certain duration of exposure to the alkali vapor and laser/pump beams
2. Requires no major changes in the optical components used in the DPAL, nor any change in operating procedures (bake outs, warm ups, etc.), but should allow improved designs that use fewer optical components
3. May be added to existing components ($\lambda/2$ overcoats) or used for new optical components
4. Reduces the heating of the substrate which improves its resistance to damage from particles sometimes found in the flowing vapor.

What is claimed is:

1. An optical component for laser light and/or pump light in an alkali vapor laser exposed to intense light and an alkali vapor in which an outermost substrate material or coating on the said optical component contacting the alkali vapor is a metal oxide or metal fluoride composition having a melting point temperature higher than a boiling point temperature of its pure metal.

2. An optical component as in claim 1 in which the metal composition is barium oxide (BaO).

3. An optical component as in claim 1 in which the metal composition is cadmium oxide (CdO).

4. An optical component as in claim 1 in which the metal composition is calcium oxide (CaO).

5. An optical component as in claim 1 in which the metal composition is magnesium oxide (MgO).

6. An optical component as in claim 1 in which the metal composition is strontium oxide (SrO).

7. An optical component as in claim 1 in which the metal composition is zinc oxide (ZnO).

8. An optical component as in claim 1 in which the metal composition is cadmium fluoride ($CdF_2$).

9. An optical component as in claim 1 in which the metal composition is of strontium fluoride ($SrF_2$).

10. An optical component as in claim 1 in which the metal composition is of magnesium fluoride ($MgF_2$).

\* \* \* \* \*